Jan. 30, 1923.
G. W. GOSS ET AL.
FARM GATE.
FILED APR. 15, 1921.
1,443,467.
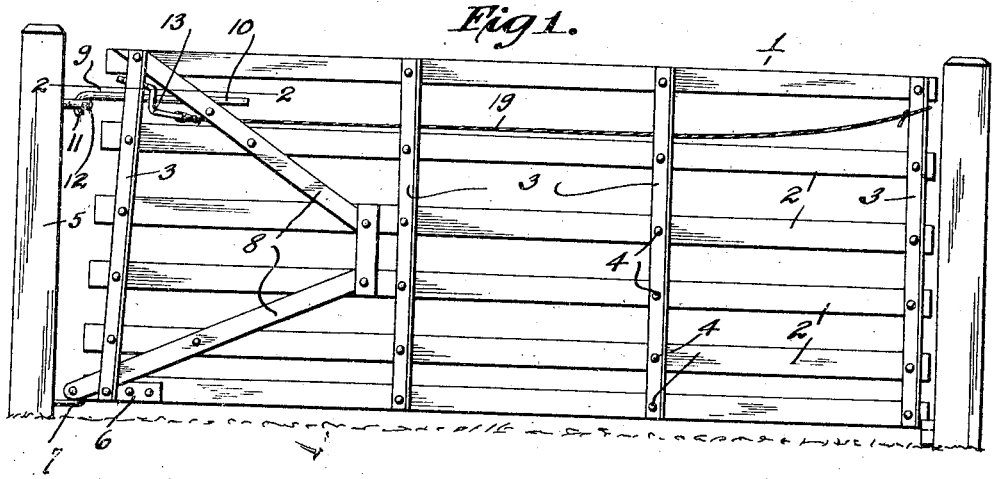
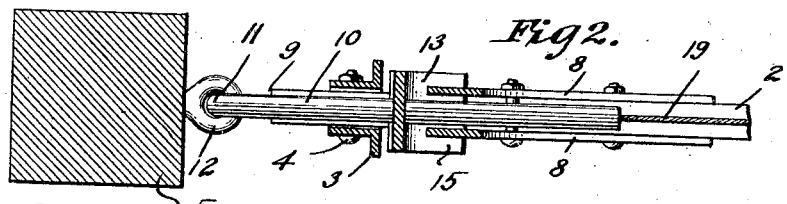
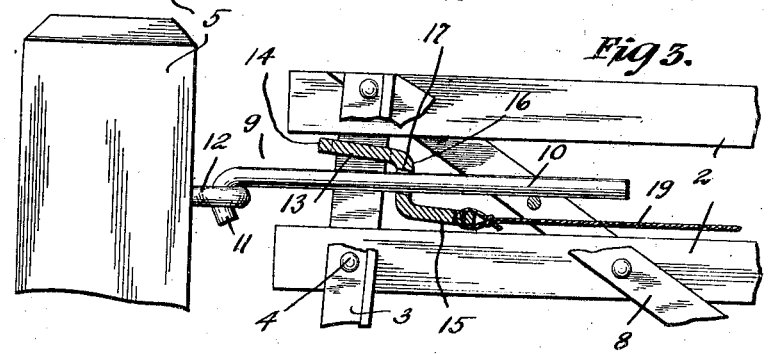
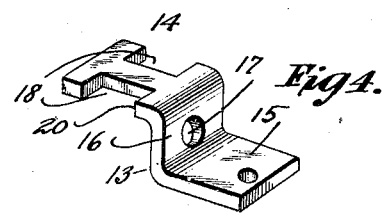
Inventor
George W. &
Charles E. Goss
By C. C. Shepherd
Attorney Patented Jan. 30, 1923.

1,443,467

UNITED STATES PATENT OFFICE.

GEORGE W. GOSS AND CHARLES E. GOSS, OF BALTIMORE, OHIO.

FARM GATE.

Application filed April 15, 1921. Serial No. 461,572.

*To all whom it may concern:*

Be it known that GEORGE W. Goss and CHARLES E. Goss, citizens of the United States, residing at Baltimore, in the county of Fairfield and State of Ohio, have invented certain new and useful Improvements in Farm Gates, of which the following is a specification.

This invention relates to improvements in farm gates, and has for its object to provide a farm gate with an improved mounting for effecting the pivotal support thereof, said support being of such nature as to permit the gate to be adjusted substantially vertically or with respect to the ground, in order that the gate may be readily positioned so that the same will be capable of swinging freely about its pivotal mounting, in order that the same may be adapted to irregularities in the ground surface over which the same may move or to be adjusted in such manner as to permit young farm stock to pass thereunder to the exclusion of other or full grown stock.

The invention consists primarily in the provision of a substantially rigid gage structure formed to include rigidly united horizontally extending bars and vertically extending metallic fastening rails, the said rails being formed in parts and the end pair thereof being adapted, in this instance, to cooperate with other improved structure for the purpose of constituting a pivotal mounting for the gate, said mounting including a substantially horizontally extending reach bar disposed to extend between said end rails and having one end thereof pivotally connected with the gate supporting standard of the gate structure, the said bar being adapted to pass through an aperture provided in a freely movable locking member, the said member being formed to include a structure designed for connection with the spaced rails, in order that the weight of the gate will be forced against said member so that the latter will be pressed into frictional engagement with the reach bar, thus enabling the gate to be raised or lowered relative to said bar and yet through the agency of the locking member, to be securely retained for free swinging movement in any of its adjusted positions.

A further object of the invention resides in forming the locking member so that the lower end thereof may be connected with a forwardly extending cable which extends to the free end of the gate, said cable upon manual operation serving to impart movement to said locking member so that the latter may be released from locking engagement with the reach bar, thereby allowing the gate as a whole to be raised or lowered, the construction of the locking member being such that when the gate proper and the cable member are released the weight of the gate will press upon the locking member so as to automatically force the latter into gripping engagement with the reach bar at any position which said member may assume with respect to said bar.

With these and other objects in view, as will appear as the description proceeds, the invention accordingly consists in the novel features of construction, combinations of elements and arrangements of parts, hereinafter to be fully described and pointed out in the appended claims.

In the accompanying drawing:

Figure 1 is a side elevation of a farm gate having a pivotal mounting constructed in accordance with the present invention, Figure 2 is a horizontal sectional view taken through the gate on the line 2—2 of Figure 1, Figure 3 is an enlarged vertical sectional view disclosing more particularly the pivotal mounting of the gate, and Figure 4 is a detail perspective view of the locking member.

Referring more particularly to the details of the invention, the numeral 1 designates a farm gate which in this instance is formed to include the usual horizontally extending spaced parallel bars 2, which are adapted to be united by means of spaced vertically extending pairs of angle iron rails 3, the rails being located on opposite sides of the bars and secured thereto in pairs by means of suitable transversely extending fastening devices 4. It will be observed that this construction provides a staunch rigidly assembled entry gate structure. The gate is supported by means of an end post 5, and to this end the lower part of the gate has its inner corner provided with spaced bars 6, which are formed to receive a rigid hook 7 carried by the posts 5, the said hooks serving to constitute a fixed support for effecting the pivotal mounting of the lower inner end of the gate. Also, the gate is braced by means of diagonally extending bars 8, which serve to relieve strain upon the pivotal end of the gate.

The present invention consists primarily in providing an improved pivotal support or mounting for the upper inner end of the gate. This mounting is designated generally by the numeral 9, and in the present instance includes a horizontally extending reach rod 10, which has its inner end terminated in a hook 11 which is adapted to be pivotally received within a fixed like member 12 projecting from the post 5. The longitudinally extending portion of the rod 10 passes between the upper ends of the rails 3 situated at the inner end of the gate and may also pass between the diagonally extending bars 8. In combination with this structure, the present invention includes a pivoted locking member 13. This member is preferably of integral construction, being suitably fashioned from metal, and is substantially Z shaped in formation, the same including oppositely extending upper and lower portions 14 and 15 respectively, which portions are united by a substantially vertically extending web 16, the said web being apertured as at 17 to receive the shank of the reach rod 10, the aperture 17 being slightly larger in diameter than said reach rod in order that the said rod may freely pass through the aperture. As shown more particularly in Figure 4 of the drawing, the upper portion 14 of the locking member is formed to include oppositely situated recesses 18, which receive the upper ends of the rails 3 situated at the inner end of the gate, the said recesses being slightly larger than the cross sectional diameter of the rails in order to permit of slight relative movement between said locking member and and the rails, the recesses 18 being so disposed as to permit the rails to pass therethrough. The lower portion of the locking member extends substantially parallel with the rod 10 and is connected to the inner end of a forwardly extending cable 19, which latter has its outer ends secured at any appropriate point to the outer end of the gate. In operation, it will be apparent that the weight of the gate will be forced against the outer shoulders 20 of the recesses 18, which results in causing the upper wall of the aperture 17 to frictionally bite into or engage with the rod 10, thus securely retaining the locking member in a fixed position upon said rod and thereby serving to provide a pivotal support for the upper end of the gate, which will operate in conjunction with the hook 7, at the lower end of the gate, to permit of free swinging movement on the part of the gate. If, however, it is desired to adjust the gate substantially vertically or with respect to the ground for any desired purpose, the operator simply pulls upon the cable 19. This results in oscillating the locking member so that the walls of the aperture 17 are in exact parallelism with the cooperative walls of the reach rod 10. This enables the gate to slide longitudinally upon the rod thus permitting of the raising and lowering of the gate as a whole, in order to eliminate the dragging of the lower portions of the gate along the ground, and to overcome sag in said gate, or to permit the latter to be raised vertically for the purpose of controlling the passage of stock thereunder, or from any other reasons which will tend to promote the usefulness and convenience of the gate. After the gate has been adjusted to assume a desired operative position, the cable and the outer end of the gate are released, thus again transferring the weight of the gate upon the shoulders 20 and causing said locking member to frictionally lock itself at any adjusted position upon the rod 10. Thus, a simplified and efficient construction is provided for both effecting the pivotal support of a gate and to permit of the retention thereof in any desired position of operation above the ground.

What is clamed is:

1. In a farm gate, a pair of spaced horizontally extending bars, vertically disposed rails uniting said bars and disposed on opposite sides thereof, a reach rod situated to extend between said bars and having the inner end thereof pivotally connected with a gate support, and an angular metallic locking member including horizontal and vertical legs, the horizontal legs being provided with diametrically opposed recesses designed for the reception of said rails, and the vertical length of an opening for the reception of said reach rod, whereby the weight of said gate will normally serve to maintain said locking member in locked frictional engagement with said rod.

2. In a farm gate, a plurality of horizontally extending bars, vertically disposed rails uniting said bars, a horizontally extending reach rod having the inner end thereof pivotally connected with a gate support, said rod being adapted to lie between said bars, and a substantially Z shaped locking member arranged to pivotally connect said gate with said rod, said locking member having the upper horizontal portion thereof formed to include diametrically opposed recesses designed for sliding engagement with said rails, the substantially vertical portion of said member being formed with an aperture for the reception of said rod, and the lower portion of said member being situated for connection with the manually operated cable.

In testimony whereof we affix our signatures.

GEORGE W. GOSS.
CHARLES E. GOSS.